(12) United States Patent
Corden et al.

(10) Patent No.: US 8,784,089 B2
(45) Date of Patent: Jul. 22, 2014

(54) FOAMED TOOLS

(75) Inventors: Thomas Joseph Corden, Huntingdon (GB); Mark Raymond Steele, Belper (GB)

(73) Assignee: Umeco Structural Materials (Derby) Limited, Derbyshire (GB)

( * ) Notice: Subject to any disclaimer, the term of this patent is extended or adjusted under 35 U.S.C. 154(b) by 8 days.

(21) Appl. No.: 12/514,102

(22) PCT Filed: Nov. 9, 2007

(86) PCT No.: PCT/GB2007/004285
§ 371 (c)(1),
(2), (4) Date: Jun. 26, 2009

(87) PCT Pub. No.: WO2008/056161
PCT Pub. Date: May 15, 2008

(65) Prior Publication Data
US 2010/0096779 A1 Apr. 22, 2010

Related U.S. Application Data

(60) Provisional application No. 60/885,664, filed on Jan. 19, 2007.

(30) Foreign Application Priority Data

Nov. 9, 2006 (GB) .................................. 0622293.9
Aug. 9, 2007 (GB) .................................. 0715524.5

(51) Int. Cl.
*B28B 7/34* (2006.01)
*B32B 27/08* (2006.01)
*B05B 1/36* (2006.01)

(52) U.S. Cl.
USPC ....... 425/90; 428/319.3; 428/319.9; 264/338; 427/340

(58) Field of Classification Search
USPC ............. 428/319.3, 319.9; 264/338; 427/340; 425/90
See application file for complete search history.

(56) References Cited

U.S. PATENT DOCUMENTS

| 3,723,584 A | 3/1973 | Nussbaum |
| 4,051,296 A | 9/1977 | Windecker |

(Continued)

FOREIGN PATENT DOCUMENTS

| CN | 1333127 A | 1/2002 |
| EP | 1238784 A1 | 9/2002 |

(Continued)

OTHER PUBLICATIONS

Translation of JP 22-74448, Toshiaki Sakakiyama, "Tool Holder Gripping Means", Nov. 8, 1990, 2 pages.*

(Continued)

*Primary Examiner* — Hai Vo
(74) *Attorney, Agent, or Firm* — Pearne & Gordon LLP

(57) ABSTRACT

A tool for use in forming moulded articles, the tool comprising a tool body formed of a foamed material, a resinous material on the tool body and elastomeric material between said tool body and resinous material to inhibit the movement of resin from the resinous material into the tool body. The invention also provides a method of manufacturing a tool, a method of moulding articles using such a tool, and elastomeric material for use in forming a tool. One particular application of the tools of the present invention is in the formation or manufacture of moulded articles using curable, resinous composite materials.

16 Claims, 2 Drawing Sheets

(56) References Cited

U.S. PATENT DOCUMENTS

| | | | |
|---|---|---|---|
| 4,192,664 A | | 3/1980 | Joshi |
| 4,851,280 A | * | 7/1989 | Gupta ............................ 442/292 |
| 4,942,013 A | * | 7/1990 | Palmer et al. .................. 264/511 |
| 5,612,066 A | * | 3/1997 | Swenson ........................ 425/425 |
| 2002/0041954 A1 | | 4/2002 | Henrichs et al. |
| 2004/0166243 A1 | * | 8/2004 | Inglefield ...................... 427/387 |
| 2005/0003195 A1 | | 1/2005 | Joseph et al. |
| 2005/0023727 A1 | * | 2/2005 | Sampson ........................ 264/257 |
| 2007/0100043 A1 | * | 5/2007 | Shiono ........................... 524/261 |
| 2007/0148409 A1 | * | 6/2007 | Rios et al. ..................... 428/167 |
| 2011/0100537 A1 | * | 5/2011 | Shahidi et al. ................ 156/212 |

FOREIGN PATENT DOCUMENTS

| | | |
|---|---|---|
| GB | 2137559 A | 10/1984 |
| GB | 2378919 A | 2/2003 |
| WO | 2004/096512 A2 | 11/2004 |

OTHER PUBLICATIONS

"Blue RTV Silicone Gasket Maker", http://www.bellautomotive.com/Blue-RTV-Silicone-Gasket-Maker-p/22-5-00270-8.htm, dated Apr. 9, 2013, 1 page.*

Search Report issued Mar. 3, 2008 in corresponding United Kingdom Patent Application No. GB0721974.4.

Search Report issued Sep. 25, 2008 in corresponding United Kingdom Patent Application No. GB0721974.4.

International Search Report for PCT/GB2007/004285, Mailing date of International Search Report Jul. 18, 2008.

Written Opinion of the International Searching Authority, Jul. 18, 2008.

Pittsburgh Corning: Foamglass Insulation [Online] Dec. 2004, XP002486744 Retrieved from the Internet: URL:http://www.foamglasinsulation.com/literature/FI201.pdf.

* cited by examiner

FOAMED TOOLS

This application is a PCT national stage application claiming priority to International Patent Application No. PCT/GB2008/002378 filed 10 Jul. 2008, which claims priority to U.S. Patent Application No. 60/885,664 filed 19 Jan. 2007, now abandoned, British Patent Application No. 0622293.9 filed 9 Aug. 2007, now abandoned, and British Patent Application No. 0622293.9 filed 9 Nov. 2006, now abandoned.

The present invention relates to foamed tools and particularly, but not exclusively, to tools comprising foamed carbon and/or glass material and methods of moulding composite materials using foamed tools.

Conventional carbon fibre tooling used for forming composite structures from curable composite materials (such as fibre reinforced resinous materials) is manufactured by machining a main tool body or master mould from either syntactic epoxy material, invar, or steel and then laminating and curing an epoxy-based low temperature cure carbon fibre prepreg onto this to give the tool a carbon skin, which will form the surface on which composite structures can be moulded. Before the skin is cured, it is normally removed from the master model and then post cured away from the main body to give the tool skin the desired glass transition temperature (Tg).

It is primarily because of the different properties of the materials of the main body or master model and the skin that necessitates removal of the skin for post-curing. For example, where the master model is a syntactic epoxy this will not withstand the temperatures required to post-cure the carbon skin (about 200° C.).

Once the skin is post-cured, it is replaced on the master model. A carbon fibre backing structure is often bonded to the back face of the tool skin to support it and stiffen the whole structure.

Such process is time consuming and expensive and the resultant tools can be limited in their application. For instance, tools of syntactic epoxy cannot be used to mould high end cure temperature composite materials (requiring cure temperatures of approx. 200° C. upwards) such as bismaleimide (BMI's), cyanate esters, polyimides and thermoplastics.

A recent advancement in tooling technology has been the development of tools comprising foamed carbon or foamed aluminium materials.

For foamed carbon tools in particular, the carbon fibre skin can be laminated directly onto the foamed carbon body for cure in situ, the foamed carbon body easily tolerating the relatively high temperatures for cure of the carbon fibre skin. This simplified process clearly has advantages over the more conventional techniques discussed above.

However, the application of foamed carbon and foamed aluminium tools for the moulding of composite materials is significantly impaired due to the open cell structure of the foam giving it high porosity characteristics.

It is found that such foam tools absorb resin from the carbon fibre skins, and other resin based curable material on the surface of the foam, thus potentially starving that skin or material of the necessary resin content for satisfactory cure and performance. Some high temperature cure resins, such as BMI's have very low viscosities particularly during cure and are therefore particularly prone to absorption into the foam structure.

Further, the inherent porosity also presents difficulties in applying non-atmospheric pressure conditions, such as vacuum conditions, to materials moulded thereon, which again presents limitations of application.

According to the present invention there is provided a tool for use in forming moulded articles, the tool comprising a tool body formed of foamed material, a resinous material on the tool body and elastomeric material located between said tool body and resinous material to inhibit the movement of resin from the resinous material into the tool body.

Preferably the elastomeric material is located directly between the tool body and resinous material and is in the form of a layer.

Preferably the elastomeric layer is continuous and preferably provides a continuous film between the tool body and the resinous material. Preferably the elastomeric material substantially prevents absorption of resin from the resinous material into the foam structure of the tool body.

The elastomeric material preferably comprises a fluoroelastomer. One such fluoroelastomer is available from Advanced Composites Group in Derbyshire, U.K., under their reference HTE18-75E. Alternatively or in addition to the elastomeric material may comprise one or more of a low temperature cure silicone elastomer, butyl elastomer and/or polyurethane elastomer.

Preferably the elastomeric material is located on the tool body in a curable condition and is cured on the tool body, preferably in situ between the tool body and the resinous material.

Preferably the resinous material is located on the elastomeric material in a curable condition, and is cured in situ on the tool body. Preferably the elastomeric material inhibits movement of resin from the resinous material when the resinous material is in the curable condition and particularly during cure of the resinous material. The resinous material is preferably in the form of a layer.

The tool body preferably comprises a foamed carbon material. Alternatively or in addition the tool body may comprise one or more of foamed thermoplastic, foamed glass and foamed ceramic.

Preferably the resinous material comprises a fibre reinforced resinous material and may be in the form of a prepreg. The material may be carbon fibre reinforced resinous material. The resinous material may be cured at relatively low temperatures, which may be less than 200° C. (approx.) and desirably between 40 and 200° C.

Alternatively, the resinous material is cured at relatively high temperatures, such as over 200° C. (approx.), and may comprise one or more of a bismaleimide, cyanate ester, polyimide, thermoplastic. The resinous material may be curable at temperatures between 200° C. and 400° C. (approx.).

The resinous material may comprise a blend of resins, some of which may be cured at relatively low temperatures, and some of which may be cured at relatively high temperatures (over 200° C.).

The resinous layer may comprise a laminate structure comprising a plurality of plys. Each ply may comprise a resin impregnated fibrous ply, a resin ply, a dry fibre ply, a prepreg, a syntactic ply, or any other known type of ply used in the formation of composite structures or tool skins. The resinous layer may comprise different plys within the plurality.

The resinous material may provide the surface(s) of the tool on which articles and structures can be formed. One or more of said surface(s) may be finished, such as by machining, sanding or the like.

According to a second aspect of the present invention there is provided a method of manufacturing a tool for use in forming moulded articles, the method comprising forming a tool body of foamed material, applying an elastomeric material to be between the tool body and a resinous material of the tool such that the elastomeric material acts to inhibit the absorption of resin from the resinous material into the tool body.

Preferably the elastomeric material is applied directly to the tool body, preferably as a continuous layer over a surface and may be applied as a relatively thin film. The elastomeric material is preferably applied in a curable condition and is cured in situ on the tool body.

Preferably the elastomeric material used comprises a fluoroelastomer. The fluoroelastomer may comprise a product available from Advanced Composites Group Limited, of Heanor, Derbyshire, U.K., under product reference HTE18-75E.

Preferably the resinous material is applied directly to the elastomeric material such that the layer of elastomeric materials located directly between the tool body and the resinous layer and acts to inhibit the movement of resin from the resinous layer into the interstices of the tool body.

The resinous material may be applied as a layer and may comprise a fibre reinforced resinous material and may be applied in the form of a prepreg. Preferably the resinous material is applied in a curable condition. The resinous layer may be cured at relatively low temperatures, such as below 200° C. and desirably between 40° C. and 200° C. Alternatively, the resinous layer may be cured at relatively high temperatures, such as above 200° C. The resinous layer may comprise one or more of a bismaleimide, cynate ester, polyimide, thermoplastic. The resinous material may comprise carbon fibres, preferably at least partially impregnated in resin.

Preferably the elastomeric and resinous materials are cured in situ on the tool body. Preferably the elastomeric and resinous materials are cured during a single cure process. This co-cure process not only provides efficiencies, but is also thought to enhance the bond that is exhibited between the body, the elastomeric material and the resinous material.

Preferably the tool body comprises a foamed carbon material. Alternatively or in addition the tool may comprise one or more of foamed thermoplastic, foamed glass and foamed ceramic.

Preferably the tool body is formed or shaped to be of approximate geometry of the desired tool prior to application of the elastomeric and resinous materials, which may involve shaping of the surface(s) which may be by way of machining, sanding or other known techniques.

The cured resinous material material may also be finished on one or more of the outer surface(s) thereof to provide the moulding surface(s) of the tool. The surface(s) may be finished by machining, sanding or other known techniques.

The resinous material may comprise a laminate of more than one ply, which laminate may comprise any combination of one or more resinous plys, non-resinous plys, prepreg plys, dry fibre plys, syntactic plys and any other plys or layers known in the production of composite articles and tool skins.

According to a third aspect of the present invention there is provided an elastomeric material for use in the manufacture of a tool having a foamed body, the elastomeric material being locatable in use between the foamed body and resinous material of the tool to act to inhibit the absorption of resin by the body from the resinous layer.

The elastomeric material may be as described above in any of the preceding twenty three paragraphs.

According to a fourth aspect of the present invention there is provided a tool for use in forming moulded articles, the tool comprising a tool body of foamed glass material.

Preferably the foamed glass material has a coefficient of thermal expansion of between 2.8 and 5.5

Preferably the foamed glass material is a borosilicate glass and preferably has a boron content of between 0.1% and 10% by weight.

Preferably the foamed glass material has a density of between 50 and 500 $Kg/m^3$, and most preferably of 180-200 $Kg/m^3$.

The foamed glass material may have a coefficient of linear thermal expansion of between 0 and $12 \times 10^{-6}$ m/m/° C. and preferably between approximately $2.8 \times 10^{-6}$/° C. and $5.5 \times 10^{-6}$/° C. ($1.6 \times 10^{-6}$/T and $3.2 \times 10^{-6}$/T) and a modulus of elasticity of approximately 12,600 $Kg/cm^2$ (180,000 psi).

The foamed glass material may gave a flexural strength of approximately 0.621 MPa (90 psi) and may have a compressive strength of between 1.38 MPa and 827 KPa (200 psi).

The foamed glass material may have a density of approximately 0.19 $gr/cm^3$ (12 $lb/ft^3$) and may have a specific heat of approximately 0.2 Kcal/Kg/° C. (0.2 BTU/lb/° F.).

The foamed glass material may have a thermal conductivity at 38° C. (mean) of approx. 0.087 W/m° K., at 93° C. (mean) of approx. 0.098 W/m° K. and at 149° C. (mean) of approx. 0.11 W/m° K.

Alternatively the foamed glass material may have a thermal conductivity at 38° C. (mean) of approx. 0.084 W/m° K., at 93° C. (mean) of approx. 0.095 W/m° K., at 149° C. (mean) of approx. 0.105 W/m° K., at 204° C. (mean) of approx. 0117 W/m° K.

Suitable foamed glass materials are available from Pittsburgh Corning (United Kingdom) Limited of Reading, Berkshire, United Kingdom under the trade marks FOAMGLAS® LCE 28 and FOAMGLAS® LCE 55.

Such foamed glass material is produced by Pittsburgh Corning to have particular neutron-absorption characteristics and is sold for the specific application of lining chimneys.

According to a fifth aspect of the present invention there is provided a method of manufacturing a tool for use in forming moulded articles, the method comprising forming a tool body of foamed glass material.

The foamed glass material used may be of a foamed material as described in any of paragraphs eleven to forty five above.

According to a sixth embodiment of the present invention there is provided a foamed glass material for use in the manufacture of a tool for moulding articles.

The foamed glass material may comprise a foamed material as described in any of paragraphs eleven to forty five above.

According to a seventh aspect of the present invention there is provided a method of moulding an article on a tool as described in any of paragraphs eleven to forty five, the method comprising laying material to be moulded on to the tool and subjecting the material to conditions to mould the material thereon.

The material preferably comprises a composites material, such as fibre reinforced resinous composite material. The material may be subjected to conditions of non-atmospheric pressure and/or temperature, such as vacuum conditions, to facilitate moulding.

Preferred embodiments of the present invention will now be described, by way of example only, with reference to the accompanying drawings, in which:—

Figure 1:
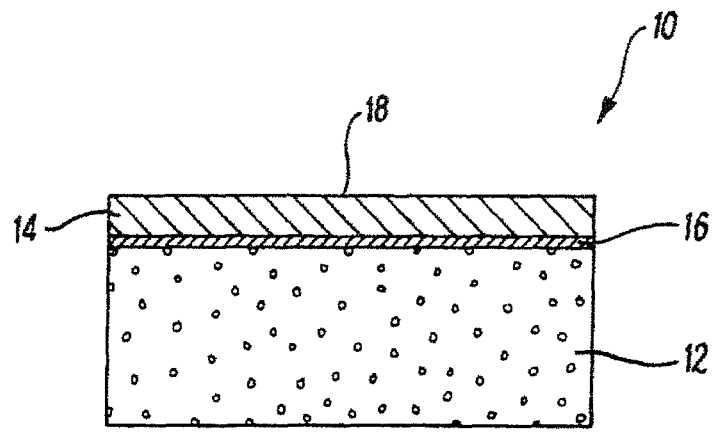
FIG. 1 is a diagrammatic cross-section of a tool according to the present invention.

The present invention provides a tool 10 for use in forming moulded articles, the tool 10 comprising a tool body 12 formed of a foamed material, a resinous material 14 on the tool body 12 and elastomeric material 16 between said tool body 12 and resinous material 14 to inhibit the movement of resin from the resinous material into the tool body 12.

The invention also provides a method of manufacturing a tool, a method of moulding articles using such a tool, and elastomeric material for use in forming a tool, as described herein.

One particular application of the tools of the present invention is in the formation or manufacture of moulded articles formed from curable, resinous composite materials. Such materials have well known advantageous properties, generally being relatively lightweight and of high strength making them useful in the manufacture of articles and components for use in many diverse industries, such as the aeronautical, motor sport, civil engineering and automotive industries, as well as in most areas of sport. Such curable composite materials are well known to those skilled in the art.

The tooling of the present invention and the associated methodologies find application for the moulding of many different types of composite materials, including both relatively low temperature cure and high end temperature cure materials. It is perhaps in relation to the latter where the present invention finds most advantage, as will be described.

In more detail, the tool body 12 can be of any suitable foamed material, but materials of particular interest are foamed carbon material and foamed glass. The construction of the foamed body 12 can depend upon the scale of the tool required. The body 12 can be formed from a single block of foamed material, or where large scale tools are required, a number of blocks can be bonded together to form the basic tool structure. The block or structure would then usually be machined or otherwise shaped to the required geometry. The body 12 illustrated in the Figures is, in cross-section, a simple rectangle for ease of illustration, but it will be appreciated that such foamed bodies can be quite intrically shaped using for example, CNC machinery. Carbon-based foam and glass-based foam can be very accurately and intricately shaped in this way.

The final moulding surface of the tool 10 will be provided by the resinous material 14 located on the body 12, and so when the body 12 is machined to the desired geometry, it is made slightly smaller than the required tool size to allow for the thickness of the resinous layer, and also the layer of elastomeric material 16.

In alternative embodiments where further layer(s) are applied over the resinous material wherein the resinous material does not provide the moulding surface of the tool, the body 12 is machined to the appropriate size and shape to take into account the further layers so that the tool surface is of the desired shape and size.

Once the body 12 has been machined to the desired geometry, then the elastomeric material 16 is applied to the appropriate surface(s) of body 12. In this embodiment the elastomeric material 16 forms a layer 16 over the body 12.

The elastomeric material comprises a fluoroelastomer, which in this embodiment is applied to the body 12 in the form of a curable film. It is however within the scope of the present invention that the elastomer is provided in other forms, such as in liquid form and may be sprayed, painted or otherwise applied.

One example of a fluoroelastomer material is available from Advanced Composites Group, in Heanor, Derbyshire, United Kingdom under reference HTE18-75E.

Product data for this elastomer are as follows:—

HTE18-75E is an uncured fluoroelastomer film. HTE18-75E may be pre-cured, at a minimum temperature of 120° C. (248° F.), to a de-mouldable condition, but a minimum of 155° C. (310° F.) is required for complete polymerisation. To achieve the maximum service temperature of >230° C. (450° F.) HTE18-75E requires a higher temperature post-cure.

Typical Properties
Uncured:

| Form | Soft Sheet |
| --- | --- |
| Colour | Black |
| Roll Width | 0.92 m (3 ft) |
| Material Standard Thickness (Vacuum bag edge seals) | 0.76 mm (0.03 in) |
| Material Standard Thickness (Caul Sheets) | 1.5 mm (0.06 inch) |
| Out life at 21° C. (70° F.) | >1 year |
| Minimum pre-cure Temperature | 120° C. (248° F.) |
| Postcure Temperature | Up to 190° C. (374° F.) |
| Oven or Vacuum Bag Mouldability | Excellent |
| Volatile Content | Nil |

Cured:

| Durometer Hardness (Shore A) | 75 |
| --- | --- |
| Tensile Strength | 18.0 MPa (2600 psi) |
| Elongation at Break | 210% |
| Modulus at 100% elongation | 7.94 MPa (1150 psi) |
| Tear Strength | TBA |
| Compression Set 24 hours at 177° C. (350° F.) and 620 KPa (90 psi) | 1.58% |
| Temperature Resistance | −23 to +357° C. (−10 to +674° F.) |
| Linear Shrinkage after 300 hours at 180° C. (356° F.) | <2% |

Thickness is generally between 1.5 mm (0.063 in) and 0.76 mm (0.031 in), although this can be adapted to suit.

The resinous material 14 is then laminated directly onto the surface of the elastomer film 16, so that the elastomer film 16 is located directly between the body 12 and the resinous material 14. The elastomer film 16 is substantially impermeable to the resin in the resinous material 14, thus acting to inhibit the transfer of resin into the body 12.

The resinous material 14 may be of any suitable curable material, and is applied as a layer.

One example is a layer or prepreg of epoxy resin matrix material with fibre reinforcements such as carbon or glass fibres, which require relatively low cure temperatures (between 40° C. and 200° C.).

Another example is a bismaleimide matrix with fibre reinforcement, which again in this embodiment is carbon fibre. This requires relatively high cure temperature (200° C.).

It will be appreciated that other curable matrix materials known to the person skilled in the art can be used, such as other low temperature cure resins and other high temperature cure resins like cyanate esters, polyimides and thermoplastics. Blends and mixtures of known materials can be used.

Once the elastomeric film and the resinous layer 14 are laminated, they are both cured in situ on the foam body 12. The body 12, elastomer 16 and resinous layer 14 bond together, with little or no migration of resin from the resinous layer 14 into the foam body 12. The elastomer 16 therefore acts to inhibit movement of resin into the foam body 12, both before and during cure.

This has been shown to work with both low temperature cure and high temperature cure resinous layers, and particularly for the latter this is a significant advantage due to the very low viscosities certain such resins, e.g. BMI's exhibit during cure. The elastomer has been shown to bond well between and to both the foam body 12 and the resinous material 14.

The tool of the present application finds particular advantage in that it can be used in the moulding of both low and high temperature cure materials, since the elastomer layer 16, the high temperature cure resinous material and the carbon or glass foam body 12 can all withstand high cure temperatures. This enables the tool to be used in the moulding of articles and structures using high temperature cure resin systems.

The elastomer layer 16 also helps prevent brittle fractures propagating between the body 12 and the resinous layer 14. The elastomer provides a compliant layer or interface between the body 12 and the resinous layer 14 which allows for a small degree of movement without damage, such movement being possible as a result of the differences between the coefficient of thermal expansion of the body 12 and layer 14, and also possible tool skin (resinous layer 14) shrinkage.

A further advantage is that the impermeable nature of the elastomer film 16 is such that it addresses difficulties of vacuum integrity during moulding of articles on the tool, as will be explained.

The resinous layer 14 as indicated above, can comprise one or more different types or blends of resinous material, according to the desired application of the tool. The layer 14 could also comprise a laminate, wherein multiple plys are provided within the layer 14. These plys may comprise the same or different material, according to known techniques.

For example, the layer 14 could comprise a single layer of fibre reinforced prepreg wherein the fibrous material is fully, partially, or generally not impregnated into the fibre. The fibre in this embodiment is carbon fibre such that the similar properties described above are relevant for a carbon foam tool. However, other fibres could be used such as glass fibres, in which case glass foam may be the preferred material for the body 12. However, a feature of the present invention is the use of glass foam having a coefficient of thermal expansion in the range 2.8 to 5.5, which renders the glass foam also particularly suitable for use as a tool body on which carbon-reinforced materials can be moulded.

The laminate may comprise one or more resinous plys laminated with one or more dry fibre layers, syntactic layers or any other layers known to those skilled in the art.

Once the resinous material and elastomer have been cured on the tool body 12, the outer surface 18 of the resinous layer 40 on which material is to be loaded for moulding, can be finished to provide the desired geometry and surface finish, such as by way of further machining, sanding or the like.

The present invention also provides a method of moulding an article on a tool as described above.

Figure 2:
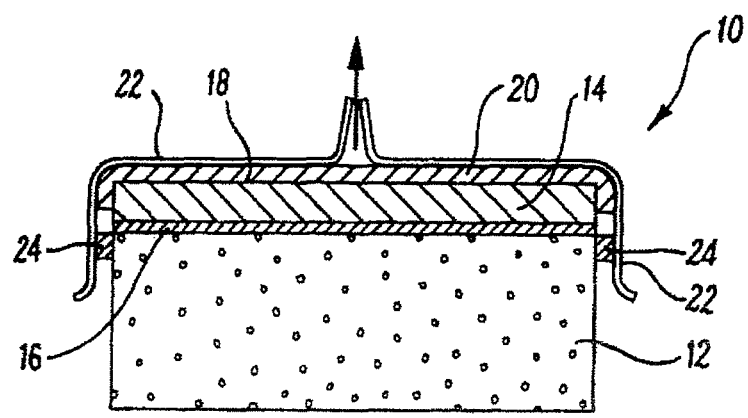
FIG. 2 is a diagrammatic cross-section of the tool of FIG. 1 in use in forming a moulded article in accordance with the present invention.

With reference to FIG. 2, material to be moulded 20 is laid on the surface 18 of the tool 10. The material 20 may be of any known composition and structure, but again a particular advantage of the present invention is that the tool 10 can withstand relatively high temperatures and therefore can be used effectively to manufacture moulded articles from curable resinous materials requiring relatively high cure temperatures.

Once the material 20 has been laid on the surface 18, it is subjected to appropriate conditions to cure the material 20. In FIG. 2, a conventional vacuum bag system is illustrated wherein a vacuum membrane 22 is located around the material 20 and sealed against the body 12 by conventional seal means 24. Details and advantages of the vacuum bagging technique will be known to those skilled in the art.

During cure, air is withdrawn in the direction of the arrow of FIG. 2 from beneath the sealed membrane 22 to facilitate consolidation and reduce the formation of voids within the material 20, again as will be understood by those skilled in the art.

Importantly, the substantially impermeable nature of the elastomeric layer 16, is such that it enables to vacuum bag arrangement to be sealed, thus providing vacuum integrity, thus avoiding the difficulties of the inherent porosity of the foamed body 12.

Figure 3:
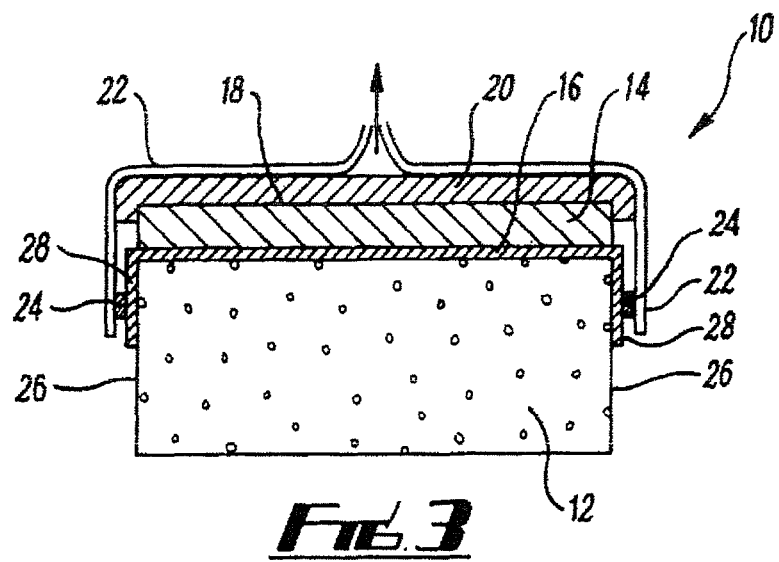
FIG. 3 is a diagrammatic cross-section of a further tool in use in forming a moulded article in accordance with the present invention.

FIG. 3 shows an alternative tool 110 wherein the elastomer layer 16 covers a larger surface area of the body 12 than the resinous material 14, in this case extending partway down the sides 26 of the body 12. This provides surface area 28 of the elastomer layer 16 against which the vacuum membrane 22 can be sealed by tacky tape 24 or other conventional means. This provides for good vacuum integrity and thus facilitates moulding.

Figure 4:
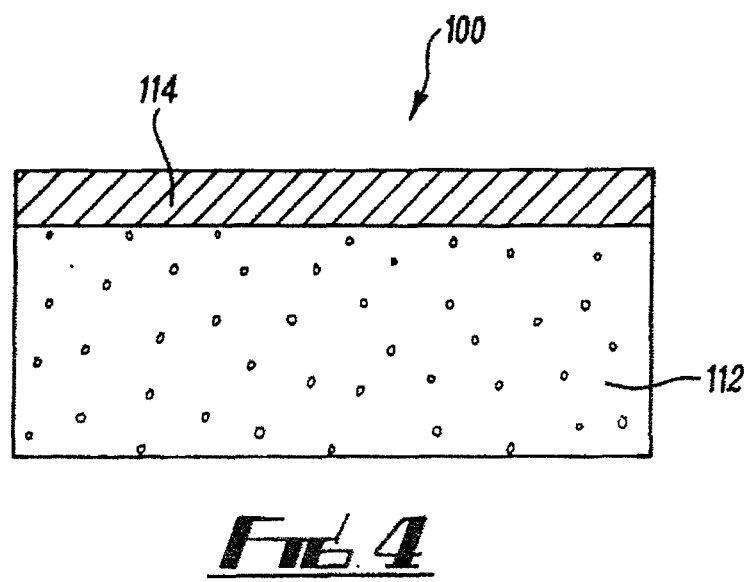
FIG. 4 is a diagrammatic cross-section of a still further tool according to the present invention.

FIG. 4 is a diagrammatic cross-section of a still further tool 100 according to the present invention. The tool 100 comprises a tool body 112 formed of a foamed material and a resinous material 114 on the body 112. In this particular embodiment the preferred material for the foamed body 112 is foamed glass. The foamed glass body 112 can be formed into the desired shape, generally as described above.

An important characteristic of the foamed glass used in this invention is that it has a thermal expansion coefficient of between 0 and $12 \times 10^{-6}$ m/m/° C., and most preferably of between 2.8 and 5.5. The latter range in particular gives the tool body 112 a coefficient of thermal expansion within or sufficiently near to the range of coefficients of thermal expansion for carbon-fibre reinforced resinous material, which enables the tool 100 to be used effectively for the moulding of carbon-fibre reinforced resinous materials, without any significant or detrimental distortion due to thermal expansion differences between the material being moulded and the tool 100.

Foamed glass is also generally cheaper to acquire and process, which provides it with an advantage over carbon foam.

The foamed glass material is a borosilicate glass having a boron content of between 0.1% and 10%, by weight.

The foamed glass material has a density of between 50 and 500 Kg/m$^3$, and most preferably of 180 to 200 Kg per m$^3$.

Particularly suitable foamed glass material is available from Pittsburgh Corning (United Kingdom) Limited of Reading, Berkshire, United Kingdom, under their trade mark FOAMGLAS® 28.

This particular glass foam has a high boron content glass, is inorganic in nature and comprising no binders.

It has thermal conductivity characteristics as follows. At 38° C. (average) its thermal conductivity is 0.084 W/m° K., at 93° C. (average) 0.095 W/m° K., at 149° C. (average) 0.105 W/m° K. at 204° C. (average) 0.117 W/m° K.

FOAMGLAS® LCE 28 has a specific heat of 0.2 kcal/kg/° C. and a density of approximately 190 Kg/m$^3$ (0.19 gms/cm$^3$). It has a compression strength of 1.38 MPa and a flexural strength of 0.62 MPa. It has a modulus of elasticity of 12,600 Kg/cm$^2$ and a coefficient of linear thermal expansion of $2.8 \times 10^{-6}$/° C. ($1.6 \times 10^{-6}$/° F.).

A further suitable material available from Pittsburgh Corning is available under their trade mark FOAMGLAS® LCE 55.

This glass foam is also a high boron content glass.

It has thermal conductivity characteristics at 38° C. (average) of 0.087 W/m° K., at 93° C. (average) 0.098 W/m° K. and at 149° C. (average) 0.11 W/m° K.

It has a specific heat of 0.2 kcal/kg/° C. and a density of 0.19 gms/cm$^3$ (190 Kg/m$^3$).

FOAMGLAS® LCE 55 has a compression strength of 827 kPa and a flexural strength of 621 kPa. It has a modulus of elasticity of 12,600 kg/cm$^2$ and a coefficient of linear thermal expansion of $5.5 \times 10^{-6}$/° C. ($3.2 \times 10^{-6}$/° F.).

These particular glass foams are manufactured by Pittsburgh Corning to have very particular and specialist neutron-absorbing characteristics and are believed to be used for the specific application of lining chimneys. The industry and application of these glass foams is very distinct and the identification and selection of the materials for use in the context of the present technology is both novel and inventive.

The tool 100 is used to mould materials thereof, generally as discussed in relation to FIGS. 2 and 3.

The tool 100 is generally formed as discussed above, without the provision of the intermediate elastomeric layer of the aforesaid embodiments.

As an alternative to the foamed glass, the body 112 may comprise foamed carbon or foamed aluminium, or indeed any other suitable foamed material.

Various embodiments may be made without departing from the spirit or scope of the present invention. For instance the resinous material or layer is described as providing the finished surface on which articles are moulded, but such moulding surface could be provided by another layer, between which and the tool body the said resinous material and elastomer are located.

The elastomeric material may be applied over a plurality of discrete surfaces or surface areas on the tool body, where absorption of resin is to be inhibited.

The elastomeric material may comprise either in addition to that described above, or as an alternative, one or more of low temperature cure silicone elastomers, butyl elastomers and/or polyurethane elastomers.

The foamed body of the tool may comprise one or more of foamed aluminium, foamed thermoplastic material, foamed glass and/or foamed ceramic.

The resinous material may comprise thermoset and/or thermoplastic resin.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A moulding tool, the tool comprising a tool body formed of foamed material, a resinous material on the tool body and elastomeric material located between said tool body and resinous material to inhibit the movement of resin from the resinous material into the tool body and to provide a compliant layer or interface between the tool body and the resinous material, wherein the elastomeric material comprises a fluoroelastomer.

2. A tool as claimed in claim 1, characterized in that the elastomeric material is located directly between the tool body and resinous material and is in the form of a layer.

3. A tool as claimed in claim 1, characterized in that the elastomeric layer is continuous.

4. A tool as claimed in claim 1, characterized in that the elastomeric layer further comprises one or more of a low temperature cure silicon elastomer, butyl elastomer and/or polyurethane elastomer.

5. A tool as claimed in claim 1, characterized in that the tool body comprises one or more of a foamed carbon material, foamed thermoplastic, foamed glass and foamed ceramic.

6. A tool as claimed in claim 1, characterized in that the resinous material comprises carbon fibre reinforced resinous material.

7. A tool as claimed in claim 1, characterized in that the resinous material comprises a blend of resins, some of which are cured at relatively low temperatures, and some of which are cured at relatively high temperatures (over 200° C.).

8. A tool as claimed in claim 1, characterized in that the resinous material provides the surface(s) of the tool on which articles and structures can be formed.

9. A method manufacturing a molding tool, the method comprising forming a tool body of foamed material, applying an elastomeric material to be between the tool body and a resinous material of the tool such that the elastomeric material acts to inhibit the absorption of resin from the resinous material into the tool body and to provide a compliant layer or interface between the tool body and the resinous material, wherein the elastomeric material comprises a fluoroelastomer.

10. A method as claimed in claim 9, characterized in that the elastomeric material is applied in a curable condition and is cured in situ on the tool body.

11. A method as claimed in claim 9, characterized in that the resinous material is applied directly to the elastomeric material such that the elastomeric material is in the form of a layer located directly between the tool body and the resinous layer and acts to inhibit the movement of resin from the resinous layer into the interstices of the tool body.

12. A method as claimed in claim 9, characterized in that the resinous material is applied in a curable condition.

13. A method as claimed in claim 12, characterized in that the elastomeric and resinous materials are cured during a single cure process.

14. A method as claimed in claim 12, characterized in that the elastomeric material inhibits movement of resin from the resinous material when the resinous material is in a curable condition and during cure of the resinous material.

15. A method as claimed in claim 12, characterized in that the tool body is formed or shaped to be of approximate geometry of the desired tool prior to application of the elastomeric and resinous materials.

16. A method of moulding an article comprising laying a material to be moulded on to the resinous material of the moulding tool as described in claim 1, and subjecting the material to be moulded to conditions to facilitate moulding.

* * * * *

UNITED STATES PATENT AND TRADEMARK OFFICE
CERTIFICATE OF CORRECTION

| | | |
|---|---|---|
| PATENT NO. | : 8,784,089 B2 | Page 1 of 1 |
| APPLICATION NO. | : 12/514102 | |
| DATED | : July 22, 2014 | |
| INVENTOR(S) | : Thomas Joseph Corden et al. | |

It is certified that error appears in the above-identified patent and that said Letters Patent is hereby corrected as shown below:

IN THE SPECIFICATION:

At column 4 line 10, please replace both instances of the capital letter "T" with °F.

At column 4 line 13, please replace 0.621 with 0.62.

At column 4 line 25, please replace 0117 with 0.117.

Signed and Sealed this
Sixth Day of January, 2015

Michelle K. Lee
*Deputy Director of the United States Patent and Trademark Office*